United States Patent [19]

Baillie et al.

[11] 3,931,006
[45] Jan. 6, 1976

[54] METHOD OF REDUCING SLUDGE ACCUMULATION FROM TAR SANDS HOT WATER PROCESS

[75] Inventors: Robert A. Baillie; James Van Dyck Fear, both of West Chester, Pa.

[73] Assignee: Great Canadian Oil Sands Limited, Toronto, Canada

[22] Filed: Oct. 17, 1974

[21] Appl. No.: 515,777

[52] U.S. Cl. .................. 210/46; 208/11; 210/83
[51] Int. Cl.² ................................. B01D 21/00
[58] Field of Search ............ 210/42, 44, 46, 55, 59, 210/66, 70, 83; 208/11

[56] References Cited
UNITED STATES PATENTS

| | | |
|---|---|---|
| 3,052,621 | 9/1962 | Clark ........................... 210/83 X |
| 3,487,003 | 12/1969 | Baillie et al. ..................... 210/42 X |
| 3,526,585 | 9/1970 | Camp ............................ 210/44 X |
| 3,751,358 | 8/1973 | Elliott ............................ 210/59 |
| 3,763,041 | 10/1973 | Cook et al. ..................... 210/42 |
| 3,816,305 | 6/1974 | Schutte ......................... 210/42 |

*Primary Examiner*—Theodore A. Granger
*Attorney, Agent, or Firm*—George L. Church; J. Edward Hess; Richard P. Maloney

[57] ABSTRACT

A method for reducing the sludge layer in an aqueous effluent retention pond associated with hot water extraction of bitumen from tar sands comprising dispersing the aqueous effluent discharge from the extraction process containing bitumen, sand, water, silt and clay over the surface of the pond thereby effecting a reduction in the volume of the sludge layer in the pond.

1 Claim, 1 Drawing Figure

U.S. Patent  Jan. 6, 1976  3,931,006
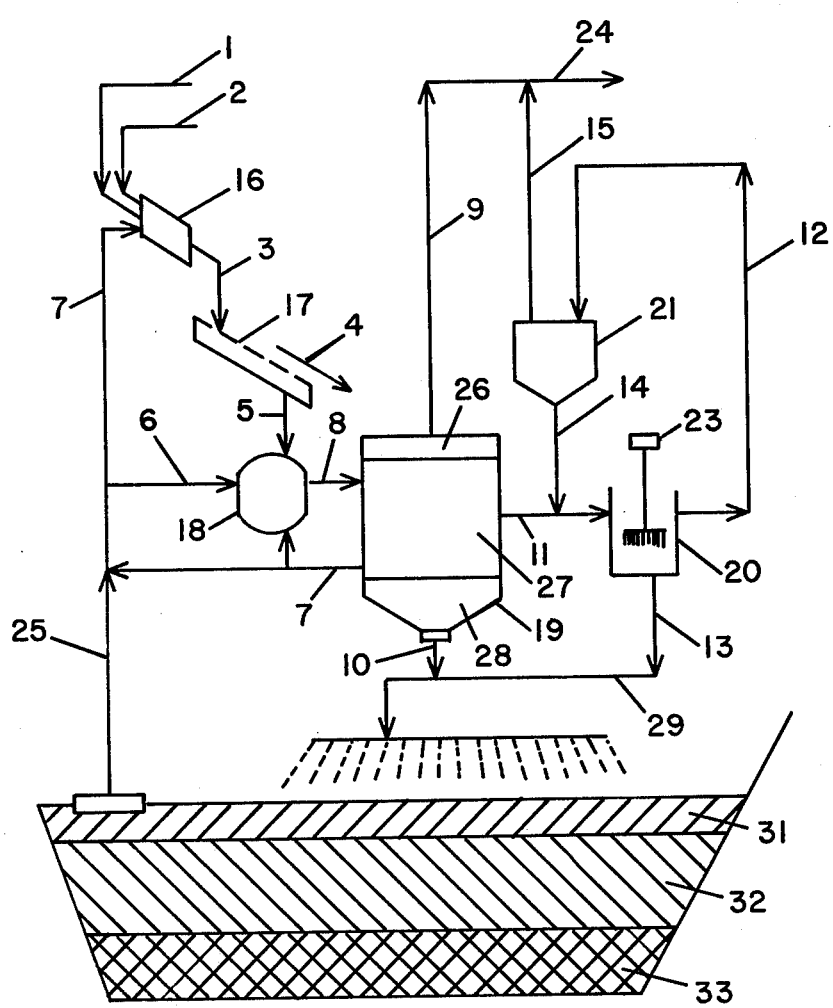

METHOD OF REDUCING SLUDGE ACCUMULATION FROM TAR SANDS HOT WATER PROCESS

BACKGROUND OF THE INVENTION

The present invention relates to an improvement in the hot water process of extracting bitumen from tar sands. This invention particularly relates to treatment of effluent discharge and treatment of water storage retention ponds used in retaining effluent discharge waste streams recovered from hot water extraction of bitumen from tar sands.

Tar sands which are also known as oil sands and bituminous sands are siliceous materials which are impregnated with heavy petroleum. The largest and most important deposits of the sands are the Athabasca sands, found in northern Alberta, Canada. These sands underlay more than 13,000 square miles at a depth of 0 to 2000 feet. Total recoverable reserves after extraction and processing are estimated at more than 300 billion barrels —just equal to the world-wide reserves of conventional oil, 60 percent of which is in the Middle East. By way of contrast, the American Petroleum Institute estimated total United States oil reserves at the end of 1965 at 39.4 billion barrels.

The tar sands are primarily silica, having closely associated therewith an oil film which varies from about 5 percent to 21 percent by weight, with a typical content of 13 weight percent of the sand. The oil is quite viscous—6° to 8° API gravity—and contains typically 4.5 percent sulfur and 38 percent aromatics.

The sands contain, in addition to the oil and sand components, clay and silt in quantities of from 1 to 50 weight percent, more usually 10 to 30 percent. The sands also contain a small amount of water, in quantities of 1 to 10 percent by weight, in the form of a capsule around the sand grains.

Several basic extraction methods have been known for many years for the separation of oil from the sands. In the so called "cold water" method, the separation is accomplished by mixing the sands with a solvent capable of dissolving the bitumen constituent. The mixture is then introduced into a large volume of water, water with a surface agent added, or a solution of neutral salt in water, which salt is capable of acting as an electrolyte. The combined mass is then subjected to a pressure or gravity separation.

In the hot water method, as disclosed in Canadian Pat. No. 841,581 issued May 12, 1971, the bituminous tar sands are jetted with steam and mulled with a minor amount of hot water at temperatures of 170° to 190°F., and the resulting pulp is then dropped into a turbulent stream of circulating hot water and carried to a separation cell maintained at a temperature of about 185°F. In the separation cell, sand settles to the bottom as tailings and oil rises to the top in the form of a froth. An aqueous middlings layer comprising clay and silt and some oil is formed between these layers. This basic process may be combined with a scavenger step for further treatment of the middlings layer obtained from the primary separation step to recover additional amount of oil therefrom.

The middlings layer either as it is recovered from the primary process or as it is recovered after the scavenger step comprises water, clay and oil. The oil content is, of course, higher in middlings which have not undergone secondary scavenger steps.

As disclosed herein the term effluent discharge is used to describe waste water streams associated with the hot water method for extracting bitumen from tar sand which streams contain at least 5 weight percent sand and are not the primary products of the hot water process. The effluent discharge is removed from the process plant as a slurry of about 35 to 75, typically 45 percent, solids by weight. Included in the slurry is sand, silt, clay and small quantities of bitumen. In this specification, sand is siliceous material which will not pass a 325 mesh screen. Silt will pass 325 mesh but is larger than 2 microns. Clay is material smaller than 2 microns including some siliceous material of that size. Included in the slurry is sand, clay and small quantities of bitumen ranging from about 0.5 to 2.0 weight percent of the total discharge. The discharge stream on an average contains 35 to 45 weight percent sand.

Because the effluent contains oil emulsions, finely dispersed clay with poor settling characteristics and other contaminants, water pollution considerations prohibit discarding the effluent into rivers, lakes or other natural bodies of water. The disposal of the effluent discharge has therefore presented a problem. Currently, effluent discharge is stored in evaporation ponds which involve large space requirements and the construction of expensive enclosure dikes. A portion of the water in the effluent discharge is recycled back into the hot water extraction process as an economic measure to conserve both heat and water. However, experience has shown that the dispersed silt and clay content of the recycled water can reduce primary froth yield by increasing the viscosity of the middlings layer and retarding the upward settling of oil flecks. When this occurs, the smaller oil flecks and those that are more heavily laden with mineral matter stay suspended in the water of the separation cell and are removed from the cell with the middlings layer.

Effluent discharge from the hot water process for extracting bitumen from tar sands contains a substantial amount of mineral matter some of which is colloidally dispersed in the effluent discharge and therefore does not settle very readily when stored in the retention pond. The lower layer of the retention pond can contain up to 50 percent dispersed mineral matter made up substantially of clay and silt and can contain up to 5 percent bitumen. This part of the pond water is normally referred to as sludge. This part of the pond is generally not suitable for recycling to the hot water extraction process for the reason that its addition into the separation cell or the scavenger cell at the normal inlet means would raise the mineral content of the middlings of the cell to the extent that recovery of bitumen would be substantially reduced. Generally, the settling which does take place in the pond provides a body of water in which the concentration of mineral matter increases substantially from the surface of the pond to the bottom thereof. One such pond now in commercial use containing effluent discharge and having a surface area of about 1000 acres and an average depth of 40 feet can be characterized somewhat as follows:

a. From the surface of the pond to a depth of 15 feet, the mineral concentration which is primarily clay is found to be about 0.5 to 5.0 weight percent. This pond water can normally be recycled to a hot water extraction process without interfering with the extraction of bitumen from tar sands.

b. The layer of water in the pond between 15 and 25 feet from the surface contains between 6 and 15 percent mineral matter. This water if recycled in any appreciable extent in lieu of fresh water to the separation cell feed with fresh tar sands would increase the mineral content of the middlings portion of the cell to the point that little bitumen would be recovered.

c. Finally, the section of the pond between 25 feet and the bottom of the pond contains 16 to 50 percent mineral matter and is normally referred to as sludge.

Any pond associated with hot water extraction of bitumen from tar sands and containing a sludge layer containing minerals as defined above is suitable for use in the method of the present invention.

DESCRIPTION OF THE INVENTION

The present invention relates to a process for treating a retention pond containing the effluent discharge normally provided when bitumen is recovered from tar sands by way of hot water extraction techniques. Specifically, the process of the present invention provides a means to improve the settling of the sludge portion of the retention pond in which effluent discharge is stored. Most particularly, the present invention provides a means whereby the sludge layer of the pond is reduced in volume to provide a pond having a lower volume of sludge therein and therefore an over-all reduction in colloidally dispersed mineral matter.

The method of the present invention essentially comprises discharging the effluent from the hot water extraction procedure in a manner so that it is widely dispersed over the surface of the retention pond. This method of adding effluent discharge to the pond allows the sand particles in the effluent to rain down on the pond and thereby rain down through the sludge layer at the bottom of the pond. By this procedure, a part of the dispersed silt and clay in this sludge layer is included in the interstitial volume between sand grains so as to provide a pond containing a substantially smaller sludge layer volume. As a result of the method of the present invention, more of the water in the pond is suitable for recycle to the hot water extraction technique thereby incorporating efficiencies of water usage in separation of bitumen from tar sands.

In order to more clearly define the present invention, the following illustration is presented. Referring to the FIGURE, bituminous tar sands are fed into a hot water extraction system through line 1 where they first pass into mixing zone 16. Water and steam are introduced from line 2 and mixed with tar sands. The total water so introduced is a minor amount based on the weight of the tar sands and generally is in the range of 10 to 45 percent by weight of the mixture. Enough steam is introduced to raise the temperature in the conditioning drum to within the range of 130°to 210°F. preferably above 170°F. Water added into the mixing zone can also be middlings or pond water recycled via line 7. An alkaline reagent can also be added to the mixing zone usually in the amount of from 0.1 to 3.0 pounds per ton of tar sands. The amount of such alkaline reagent preferably is regulated to maintain the pH of the middlings layer in separation zone 19 within the range of 7.5 to 9.0. The best results are obtained at a pH value of 8.0 to 8.5. The amount of alkaline reagent that needs to be added to maintain the pH value in the range of 7.5 to 9.0 can vary from time to time as the composition of the tar sands obtained from the mine site varies. The alkaline reagents normally used for this purpose are caustic soda, sodium carbonate or sodium silicate although any of the other alkaline containing reagents known for this application in the art can be used if desired.

The mixture from zone 16 can then be passed via line 3 to screen indicated at 17. The purpose of screen 17 is to remove from the pulp any debris such as rocks or over-sized lumps of tar sands as indicated generally at 4. The pulp then passes via line 5 from screen 17 into sump 18 wherein it is diluted with additional water from line 6 which can be recycled from the pond surface via line 25 or fresh water from a fresh water source or can also be a mixture of any of these two combined with middlings from separation zone 19 added via line 7. Addition of water now places the pulp in a pumpable condition so that it can be easily transferred into separation zone 19. Additional water wash can also be added to screen 17 to wash the pulp into sump 18 in place of the water added via line 6. In normal practice the total amount of water added to the tar sands pulp as liquid water and as steam prior to the separation step should be in the range of 0.2 to 3.0 pounds per pound of the tar sands. The water requirements for the separation zone, of course, are contingent upon the quantity of silt and clay which the tar sands contain as compared to the bitumen content of the tar sands. For example, when 15 percent by weight of the mineral matter of the tar sands has a particle size below 2 microns, the fresh water added generally can be about 0.3 to 0.5 pounds per pound of tar sands. On the other hand, when 30 percent mineral matter is below 2 microns in diameter generally a larger quantity such as 0.7 to 1.0 pounds of water per pound of tar sands is required. It is a general rule the amount of water needed within the process as fresh water increases as the clay content relative to the bitumen content of the tar sand increases and to some degree as the silt content increases.

The tar sands slurry is transferred from sump 18 to separation zone 19 via line 8. In separator zone 19 the slurry mixture is agitated by conventional means and contents of the separation zone normally separates into an upper bitumen froth layer as indicated by 26, a middlings layer indicated by 27 and sand tailings layer indicated by 28 in the FIGURE. From separation zone 19, the bitumen froth in the form of a primary bitumen froth is recovered via line 9. Middlings from the zone can be withdrawn for recycling via line 7 as previously disclosed and also middlings are withdrawn via line 11 and transferred into a secondary recovery zone known as a flotation scavenger zone 20. In a scavenger zone air is provided via aerator 23 so that an air flotation operation can be conducted. Air is provided at a locus where agitation of the middlings is being effected so that the air becomes dispersed in the middlings and forms small bubbles. Small bubbles combined with the bitumen aid in floating the bitumen to the surface of scavenger zone 20 wherein it is withdrawn via line 12 into froth settler zone 21 where again the froth is permitted to settle. The froth in zone 21 is recovered via line 15 from the top of the settler and combined in line 24 with the froth from line 9. The tailings from zone 21 containing mineral and water and some bitumen is withdrawn via line 14 and added to line 11 wherein it is recycled into flotation scavenger zone 20. The tailings from scavenger zone 20 are withdrawn via line 13 and combined with the tailings from the separation zone 19 which are withdrawn via line 10 both of which are combined in line 29 and thereafter pumped to the settling pond as the effluent discharge. Combined they normally contain about 40 weight percent sand.

The pond as shown in the FIGURE can be thought of as having three zones of mineral and bitumen dispersed in water. This description is characteristic of a pond storing the effluent discharge of a hot water process as herein above described. The upper layer 31 of the pond dependent on the mode of operation of the extraction process can contain 1 to 80 percent and often 5 to 40 percent of the pond volume and is the uppermost layer in the pond. This layer of the pond normally contains between 0.5 to 5.0 weight percent mineral matter generally in the form of fine clay less than 2 microns in size. The number 32 in the FIGURE denotes the middle layer of the pond which can contain 5 to 20 percent mineral matter including clay and silt dispersed colloidally. The lower layer of the pond 33 can be 40 percent of the volume of the pond which can contain up to 50 percent mineral matter in the form of clay and silt. This layer in the pond is commonly referred to as sludge and has not been suitable for use in any part of the hot water extraction process as disclosed above.

EXAMPLE

As a typical example of utilization of the invention herein disclosed, an effluent from the hot water extraction of bitumen from tar sands having approximately 48 percent water by weight, 40 percent by weight sand, 2 percent by weight silt, 9 percent by weight clay and 1 percent by weight bitumen was collected from the hot water extraction as an effluent discharge and is sprayed over the surface in an arc of about 100 feet in diameter of a settling pond of approximately 380 acres in surface area. The sand in the effluent is provided at the rate of about 180 tons per day per acre. The pond has an average depth of about 40 feet having the characteristics as is shown in the FIGURE.

As is disclosed in the process of the present invention, when the sand particles rain down through the upper two layers of the pond and thereafter through the final lower layer, the sludge layer of the pond, compaction of the minerals in the intersticies of the sand is effected whereby more water of lower mineral content is provided in the pond. The compaction caused by the raining of the sand through the sludge layer at the bottom of the pond results in particles of clay and silt replacing water which normally is found in the intersticies of sand. Thus more of the mineral matter is compacted thereby providing a water layer in the pond of a lower dispersed mineral content.

For any noticeable effect to be realized the effluent sprayed on the pond should be applied to provide from about 50 tons per day per acre of pond to about 500 tons per day per acre of pond. The means of applying the effluent discharge to the pond can include of floating barge with a flexible line which permits continuous change in the area of application of the effluent discharge stream.

Thus the invention comprises a method of depositing effluent discharge containing sand in a retention pond for storing effluent discharge from the hot water extraction of bitumen from tar sands which comprises dispersing said effluent discharge over the upper surface of the pond. Essentially the present invention comprises a method of compacting the sludge layer of a retention pond for storing effluent discharge recovered from the hot water extraction of bitumen from tar sands, said pond containing a sludge layer under a non-sludge layer which comprises raining sand through said sludge layer thereby compacting said sludge and increasing the proportion of the non-sludge layer in the pond.

The invention claimed is:

1. In a hot water process for extracting bitumen from tar sands wherein said tar sands are mulled with water at a temperature in the range of 170° to 190°F. to provide a bituminous froth product and a waste water stream containing 35 to 75% solids by weight including sand, silt, clay and bitumen and wherein said waste water stream is stored in a retention pond containing an upper layer of water and a lower layer of sludge containing up to 50% by weight dispersed solids including clay, silt and bitumen, the improvement which comprises a method for compacting said sludge layer which comprises dispersing said waste water stream over the surface of said pond thereby raining the sand in said waste water stream through said sludge layer thereby compacting said sludge layer and increasing the proportion of the non-sludge layer in the pond.

* * * * *